United States Patent Office 3,009,820
Patented Nov. 21, 1961

3,009,820
SIZING COMPOSITION
Charles W. Gould, Wilmington, Del., assignor to Hercules Powder Company, Wilmington, Del., a corporation of Delaware
No Drawing. Filed Dec. 4, 1959, Ser. No. 857,250
16 Claims. (Cl. 106—123)

This invention relates to aqueous sizing compositions, to a method of preparing such compositions and to the use of same in the sizing of paper, paperboard and the like. The invention is more particularly directed to the manufacture and use of aqueous sizing compositions containing a mixture of hydrocarbon wax and tall oil pitch.

A principal object of the invention is the provision of a process for the production of stable aqueous emulsions of mixtures of hydrocarbon wax and tall oil pitch.

A further object of the invention is the production of a hydrocarbon wax-tall oil pitch emulsion which will impart a high degree of sizing or water-resistance to fibrous materials such as insulation board, hard board and insulation paper.

Another object of the invention is the production of a hydrocarbon wax-tall oil pitch emulsion which will waterproof mineral products such as gypsum board and concrete.

In accordance with the invention, it has been found that mixtures of hydrocarbon wax and tall oil pitch can be formed into stable emulsions by neutralizing at least about 50% of the acidity of the pitch with an alkali, emulsifying the resulting mixture and adding an auxiliary stabilizer. In carrying out the process of the invention in accordance with a preferred procedure the hydrocarbon wax and tall oil pitch are first melted together and the alkali then added with good mixing. The mixture is then subjected to an emulsification process such as inversion or homogenization to obtain a small particle size. The auxiliary stabilizer may be added at any convenient point during or following addition of the alkali. The resulting emulsions are of good quality and stability.

The emulsions, produced as above described, may be used with excellent results in the beater sizing of paper, paperboard and the like. In such use, these emulsions are preferably diluted to about 5–30% solids and then added to the papermaking system at any point ahead of sheet formation. The amount added should be sufficient to give the desired sizing or water-resistance and will usually vary from about 0.3% to about 2.0% emulsion solids based on the dry weight of the pulp. A suitable precipitating agent such as alum is added either before or after the emulsion in amounts from about .05% to about 3.0% and the pulp sheeted and dried in the usual manner.

Having described the invention generally, the following examples are given to illustrate specific embodiments thereof. In these examples the tall oil pitch utilized was obtained by the fractional distillation of crude tall oil and had the following typical analysis:

| | |
|---|---|
| Acid number | 40–60 |
| Rosin acids percent | 15–20 |
| Fatty acids do | 5–12 |
| Saponification number | 95–125 |
| Unsaponifiables percent | 20–30 |

The tall oil fatty acid fraction utilized contained about 76.9% fatty acids, about 20.6% rosin acids, about 2.0% neutral bodies and about 0.8% unsaponifiables and had an acid number of 191.6. The Dowicide G was a commercial grade of sodium pentachlorophenate.

Example 1

An emulsion was made up according to the following formulation:

| Ingredients | Grams | Parts per 100 parts emulsion |
|---|---|---|
| Slack wax | 594 | 23.75 |
| Tall oil pitch (A.N.=47.6) | 563.5 | 22.56 |
| Tall oil fatty acids | 30.5 | 1.22 |
| Potassium hydroxide (100% basis) | 23.75 | .95 |
| Dowicide G (100% basis) | 2.5 | .1 |
| Wyoming bentonite | 37.5 | 1.5 |
| Total water [1] | 1,248 | 49.9 |

[1] Included water to dissolve the potassium hydroxide (150 grams); water to dissolve Dowicide G (10 grams); water to hydrate bentonite (693 grams); and hot dilution water (395 grams).

The slack wax, tall oil pitch and tall oil fatty acids were weighed out in a stainless steel beaker, then melted together. The temperature was adjusted to 88–90° C. and the solution of potassium hydroxide was added slowly with vigorous stirring over a period of 20 minutes, keeping the temperature as close to 90° as possible. The hot dilution water at 75–85° C. was then added over a period of 22 minutes. After about ⅔ of the water had been added, the mixture inverted from a water-in-oil emulsion to an oil-in-water emulsion. The Dowicide G solution was added and the heat removed from the emulsion which was then at 85° C.

A slurry of Bentonite TAT prepared by stirring the bentonite in water for 30 minutes at room temperature was added over a period of 10 minutes during which the temperature dropped to 53° C. The emulsion was then cooled to room temperature in a cooling bath with gentle stirring and water added to adjust the solids to 50%. The resulting emulsion showed only a trace of water separation after storage at room temperature for six weeks. It diluted to a 3% emulsion without any separation of wax or pitch.

Example 2

An emulsion was made up according to the following formulation:

| Ingredients: | Grams |
|---|---|
| Slack wax | 594 |
| Tall oil pitch (A.N.=55) | 594 |
| Potassium hydroxide (85% KOH) | 28 |
| Dowicide G | 2.5 |
| Wyoming bentonite | 37.5 |
| Total water [1] | 1350 |

[1] Includes water for potassium hydroxide (150 grams); for bentonite slurry (694 grams); for hot dilution water (496 grams); and for Dowicide G solution (10 grams).

The procedure of Example 1 was followed. The resulting emulsion could be diluted to 3% solids without separation of wax or pitch. After six weeks' storage there was no separation of aqueous phase.

Example 3

An emulsion was made up according to the following formulation:

| Ingredients: | Grams |
|---|---|
| Slack wax | 594 |
| Tall oil pitch (A.N.=42.6) | 544 |
| Tall oil fatty acids | 50 |
| Potassium hydroxide (85% KOH) | 28 |
| Dowicide G | 2.5 |
| Wyoming bentonite | 37.5 |
| Total water [1] | 1250 |

[1] Includes water for potassium hydroxide (150 grams); for bentonite (694 grams); for hot dilution water (396 grams); for Dowicide G (10 grams).

The procedure of Example 1 was followed. The resulting emulsion could be diluted to 3% solids without any separation of wax or resin. There was no separation of the aqueous phase after six weeks' storage at room temperature.

*Example 4*

An emulsion was made up according to the following formulation:

| Ingredients: | | Actual amount |
|---|---|---|
| Tall oil pitch (A.N.=53) | pounds | 641 |
| Fully refined wax (M.P.=135–137° F.) | pounds | 641 |
| Potassium hydroxide (100% basis) | do | 30.5 |
| Dowicide G (100% basis) | do | 2.75 |
| Wyoming bentonite | do | 27.0 |
| Total water [1] | gallons | 161.75 |

[1] Includes water for potassium hydroxide solution (19 gallons); for bentonite hydration (60 gallons); for Dowicide G 20% solution (2.75 gallons); and for cold dilution water (80 gallons).

The molten tall oil pitch was charged into an open baffle kettle with paddle stirrer. The bentonite was added to the water in a tank having a propeller stirrer. The mixture was stirred and heated with steam to 90° C., then held at 90° C. for 20 minutes. The tall oil pitch was held at 90–95° C. and molten wax added with stirring. Following this the potassium hydroxide solution was added over a period of 20 minutes, still holding the temperature at 90–95° C. The temperature was then allowed to drop to 80° C. and held there until all the bentonite was added (35 minutes). Inversion from a water-in-oil emulsion to an oil-in-water emulsion took place after ½ to ¾ of the bentonite slurry had been added. The Dowicide G solution was then added and cooling water started through the jacket. The cold dilution water was added in 15 minutes. When the mixture reached 50° C., a sample was taken for total solids determination and sufficient water was added to bring to 50% total solids. At 35° C. the emulsion was drummed out. The emulsion could be diluted to 3% without any separation of wax or resin and showed no water separation after storage for six weeks at room temperature.

The novel sizing compositions of the invention contain as essential ingredients a hydrocarbon wax, a partially neutralized tall oil pitch, and an emulsion stabilizer. Typical of the hydrocarbon waxes suitable for use herein are crude scale paraffin wax, slack wax, petrolatum, fully refined paraffin wax, microcrystalline wax or mixtures of these waxes.

The tall oil pitch contemplated for use herein is the residue or still bottoms resulting from the fractional distillation of crude tall oil whereby the fatty and resin acids and other distillable materials are removed leaving the pitch. It is a tarry, dark brown substance, the specific characteristics of which vary somewhat depending on the composition of the crude tall oil, the conditions of treatment and so on. The following is an analysis of a typical sample of tall oil pitch obtained by the fractional distillation of tall oil:

| | |
|---|---|
| Color (Gardner=50% in benzene) | 1 8 |
| Saponification number | 123 |
| Acid number | 44 |
| Rosin acids (Wolff method, percent) | 16.4 |
| Percent fatty acids (free) | 7.4 |
| Percent neutrals | 46.7 |
| Other unsaponifiables, percent | 28.4 |
| Ash, percent | 0.4 |
| Water, percent | 0.00 |

The acid number of the tall oil pitch as contemplated for use herein may vary from about 30 to about 62 or higher. In the case of tall oil pitches having an acid number below about 40, the acid number of the whole acid fraction is preferably raised to about 50–55 to facilitate preparation of the emulsion. This may desirably be accomplished by the addition of a high acid number material such as oleic acid, linoleic acid or fatty acid mixtures containing these and/or other unsaturated acids together with minor amounts of saturated acids. A very satisfactory material for the purpose is a fatty acid fraction obtained by the fractional distillation of tall oil, such fraction containing mostly tall oil fatty acids with smaller percentages, i.e., from about 15% to about 45% rosin acids.

The ratio of pitch to wax in these aqueous emulsions may vary from about 60:40 to about 40:60. Preferred ratios are from 55:45 to 45:55. Most preferred is a ratio of about 50:50.

The preferred alkali contemplated for use herein is potassium alkali, i.e., potassium hydroxide or carbonate, or mixtures containing at least about 50% potassium alkali, the remainder being sodium alkali. Sufficient alkali should be used to neutralize from about 50% to about 100% or more of the acidity of the tall oil pitch. The specific amount will vary depending upon such factors as the acid number of the pitch and the ratio of pitch to wax in the emulsion. In general, amounts from about 0.03 part to about 0.06 part of alkali (100% basis) per part of tall oil pitch will usually be satisfactory. It is preferred to utilize from about 0.036 part to about 0.044 part on the same basis. However, if the tall oil pitch has an extremely low acid number, e.g., 40, it is preferred to not exceed the amount of alkali to just neutralize the acidity.

The aqueous emulsions of the invention are desirably prepared at solids contents from about 45 to about 55% and preferably about 50%. They may be prepared at higher solids contents, i.e., up to about 60% solids. They may also be prepared at lower solids contents, i.e., as dilute emulsion, although this will generally be undesirable due to increased transportation and storage costs.

The aqueous emulsions of the invention contain an auxiliary emulsion stabilizer such as bentonite, gum ghatti, gum arabic, starch or the like. These will be used in amounts sufficient to stabilize the emulsion, i.e., within the range from about 0.5% to about 3.0%, based on the emulsion.

Auxiliary emulsifiers may be utilized to advantage in some cases in the preparation of these emulsions. Examples of auxiliary emulsifiers suitable for use herein are the alkali metal salts of fatty or resin acids or mixtures of the two.

The novel products of the invention are smooth, homogeneous, tan-colored emulsions. The viscosity generally ranges from 1,750 to 4,500 centipoises at 25° C. (Brookfield viscometer No. 4 spindle 60 r.p.m.) depending on the particle size, percent neutralization of the pitch, the type of pitch, and the concentration of auxiliary emulsion stabilizer. During the first two or three weeks after the emulsion is made, the viscosity will rise as much as 1,000 centipoises, and the figures given here refer to the ultimate viscosity. As described in the examples, the emulsions are stable to dilution. They break on addition of calcium salts, alum or acid. Moreover, they generally show no separation of a water phase on standing six weeks at room temperature.

The emulsions of the invention are superior to many other existing materials for imparting water resistance to fibrous materials such as insulating board, insulating paper and other structural materials. They have also been used to advantage for waterproofing the gypsum core in gypsum board.

To illustrate use of the emulsions of the invention in various applications, large-scale batches of the composition of Example 2 were prepared and used for mill trials. In one case a trial run was made in an insulating board mill on ½-inch board. Hourly samples (12 inches by 12 inches) were tested for water resistance by immersion in water for two hours under a 1-inch head at 70° F. and then measuring the percent water absorbed by volume.

When 2.5% rosin and 0.625% liquid wax, based on the weight of dry pulp, was used, the average water absorption over an 11-hour period was 4.1%. When 1.65% of pitch-wax emulsion (solids based on dry weight of pulp) was used, the average water absorption over a 10-hour period was 4.4%. Thus, the pitch-wax emulsion gave approximately the same resistance to water absorption as the more expensive rosin-liquid wax blend and less of the pitch-wax product was required to accomplish this result.

In another plant, a trial of this same pitch-wax emulsion on insulation board showed that 0.9% of the pitch-wax emulsion was as efficient a size as 1.3% of the more expensive rosin-wax mixture that had been used. In still another plant, a trial of this same pitch-wax emulsion on a type of insulation board used in roof construction was run. This trial showed that 1.18% of this emulsion gave better water resistance than 3.16% asphalt emulsion.

A large-scale batch of emulsion was made up according to the formulation and procedure of Example 4. In a trial at a gypsum board plant, it was found that the use of 7 gallons of the emulsion per 1,000 square feet of ½-inch board gave a water absorption of 10% (2 hours' immersion at room temperature at 2-inch head). The customary sizing material, an asphalt emulsion, required 10–12 gallons to give sizing in the same range.

In addition to the above applications, the emulsions of the invention are also useful for increasing the water resistance of other fibrous materials such as building paper, insulation paper, roofing board, hard board, medium density sheathing and particle board. Moreover, its effectiveness in waterproofing gypsum suggests its use in concrete and, mixed with clay or other soil, in temporary earth dams where water resistance is desired for a short time.

What I claim and desired to protect by Letters Patent is:

1. A sizing composition consisting essentially of an aqueous emulsion containing hydrocarbon wax, tall oil pitch, and an emulsion stabilizer, at least 50% of the acidity of the tall oil pitch having been neutralized with a material selected from the group consisting of potassium alkali and mixtures of potassium alkali with sodium alkali, and the ratio of tall oil pitch to wax being within the range from about 60:40 to about 40:60.

2. A sizing composition in accordance with claim 1 in which at least 50% of the acidity of the tall oil pitch is neutralized with potassium hydroxide.

3. A sizing composition in accordance with claim 1 containing from about 0.5% to about 3% of the emulsion stabilizer.

4. A sizing composition in accordance with claim 3 in which the emulsion stabilizer is bentonite.

5. A sizing composition in accordance with claim 1 containing a fatty acid mixture.

6. A sizing composition in accordance with claim 1 containing a fatty acid-resin acid fraction derived from tall oil.

7. A sizing composition in accordance with claim 1 containing a fatty acid-resin acid fraction derived by the fractional distillation of tall oil.

8. A process of preparing an aqueous sizing composition which comprises melting a mixture of hydrocarbon wax and tall oil pitch in which the ratio of tall oil pitch to hydrocarbon wax is from about 60:40 to 40:60, adding to the mixture sufficient material selected from the group consisting of potassium alkali and mixtures of potassium alkali with sodium alkali to neutralize at least about 50% of the acidity of the tall oil pitch, dispersing the heated mixture in an aqueous medium to first form a water-in-oil emulsion which subsequently inverts to an oil-in-water emulsion, and adding an emulsion stabilizer to the aqueous sizing composition at any point following addition of a portion of the neutralizing material.

9. A process in accordance with claim 8 in which the material to neutralize at least 50% of the acidity of the tall oil pitch is potassium hydroxide.

10. A process in accordance with claim 8 wherein from about 0.5 to 3% of the emulsion stabilizer is incorporated with the emulsion.

11. A process in accordance with claim 10 wherein the emulsion stabilizer is bentonite.

12. A process in accordance with claim 8 wherein a fatty acid mixture is added to the mixture of hydrocarbon wax and tall oil pitch.

13. A process in accordance with claim 12 wherein the fatty acid mixture is a fatty acid fraction derived from tall oil.

14. A process in accordance with claim 12 in which the fatty acid mixture is a fatty acid-resin acid fraction derived from tall oil.

15. The method of improving the water resistance of fibrous materials which comprises incorporating therewith from about 0.3% to about 2.0% (solids basis) of a sizing composition consisting essentially of an aqueous emulsion containing hydrocarbon wax, tall oil pitch and an emulsion stabilizer, at least 50% of the acidity of the tall oil pitch having been neutralized with a material selected from the group consisting of potassium alkali and mixtures of potassium alkali with sodium alkali, and the ratio of tall oil pitch to wax being within the range from about 60:40 to about 40:60.

16. The method of claim 15 in which the emulsion stabilizer is bentonite.

References Cited in the file of this patent

UNITED STATES PATENTS

| | | |
|---|---|---|
| 2,421,672 | Wilson | June 3, 1947 |
| 2,717,241 | Hook et al. | Sept. 6, 1955 |
| 2,754,206 | Olson | July 10, 1956 |
| 2,934,468 | Strazdins | Apr. 26, 1960 |
| 2,974,106 | Fronmuller et al. | Mar. 7, 1961 |
| 2,993,800 | Pickell | July 25, 1961 |